US012611824B2

(12) United States Patent　　(10) Patent No.:　US 12,611,824 B2
Chowdhury　　　　　　　　　　　　(45) Date of Patent:　　　Apr. 28, 2026

(54) METHOD FOR PREFORMING A WORKPIECE, COMPOSITE MANUFACTURING METHOD AND SYSTEM ASSOCIATED THEREWITH

(71) Applicant: The Boeing Company, Arlington, VA (US)

(72) Inventor: Nayeem Chowdhury, Melbourne (AU)

(73) Assignee: The Boeing Company, Arlington, VA (US)

( * ) Notice: Subject to any disclaimer, the term of this patent is extended or adjusted under 35 U.S.C. 154(b) by 264 days.

(21) Appl. No.: 18/161,170

(22) Filed: Jan. 30, 2023

(65) Prior Publication Data

US 2024/0253316 A1　　Aug. 1, 2024

(51) Int. Cl.
　　*B29C 70/00*　　　(2006.01)
　　*B29C 70/68*　　　(2006.01)
　　*B29K 105/08*　　　(2006.01)
　　*B29K 307/04*　　　(2006.01)
(52) U.S. Cl.
　　CPC ...... *B29C 70/683* (2013.01); *B29C 2791/006* (2013.01); *B29K 2105/089* (2013.01); *B29K 2307/04* (2013.01)
(58) Field of Classification Search
　　CPC ... B29C 33/308; B29C 70/683; B29C 33/505; B29C 70/3452; B29C 70/345; B29C 70/44; B29C 70/443; B29C 37/0003; B29C 71/00
　　See application file for complete search history.

(56) References Cited

U.S. PATENT DOCUMENTS

| | | | | | |
|---|---|---|---|---|---|
| 5,151,277 | A | * | 9/1992 | Bernardon | B29C 70/443 |
| | | | | | 249/161 |
| 5,427,518 | A | * | 6/1995 | Morizot | B29C 70/38 |
| | | | | | 100/211 |
| 5,846,464 | A | * | 12/1998 | Hoffman | B29C 33/308 |
| | | | | | 425/DIG. 30 |
| 7,267,542 | B2 | * | 9/2007 | Younie | B29C 33/3821 |
| | | | | | 425/389 |

(Continued)

FOREIGN PATENT DOCUMENTS

| | | | | |
|---|---|---|---|---|
| CA | 2774468 A1 | * | 3/2011 | ..... B29C 31/008 |
| EP | 3 290 177 | | 3/2018 | |

(Continued)

OTHER PUBLICATIONS

Mechanical translation of Dumargue et al (FR-2586660-A1) dated Mar. 1987.*

(Continued)

*Primary Examiner* — Thu Khanh T. Nguyen
(74) *Attorney, Agent, or Firm* — Walters & Wasylyna LLC

(57)　　　　　ABSTRACT

A method for preforming a workpiece includes engaging a conformable member with a work surface of a worktable upon which the workpiece is prepositioned. The worktable is used to shape the workpiece to a desired shape. The conformable member retains the workpiece and disengages from the worktable while maintaining the desired shape of the workpiece. A system for preforming the workpiece includes the conformable member and the worktable. A composite manufacturing method and additional methods for preforming the workpiece are also provided.

25 Claims, 14 Drawing Sheets

(56)　　　References Cited

U.S. PATENT DOCUMENTS

| | | | | |
|---|---|---|---|---|
| 7,691,222 | B2 * | 4/2010 | Kuntz | B29C 33/308<br>264/225 |
| 8,057,206 | B1 * | 11/2011 | McKnight | B29C 33/307<br>249/161 |
| 9,427,898 | B2 * | 8/2016 | Percival, Jr. | B29C 33/0011 |
| 10,105,911 | B2 * | 10/2018 | Duclos | B29C 70/38 |
| 11,001,016 | B2 * | 5/2021 | Vlavianos | B29C 33/02 |
| 11,577,431 | B2 * | 2/2023 | Almousa | B29C 33/3857 |
| 2010/0320642 | A1 * | 12/2010 | Weimer | B29C 70/342<br>264/258 |
| 2014/0037780 | A1 * | 2/2014 | Jones | B29C 45/80<br>425/162 |
| 2014/0292010 | A1 * | 10/2014 | Graupner | B25J 15/00<br>294/216 |
| 2023/0182412 | A1 | 6/2023 | Halbritter et al. | |
| 2023/0286229 | A1 | 9/2023 | Chowdhury | |
| 2023/0330950 | A1 | 10/2023 | Chowdhury | |

FOREIGN PATENT DOCUMENTS

| | | | |
|---|---|---|---|
| EP | 3444092 | A1 * | 2/2019 |
| FR | 2586660 | A1 * | 3/1987 |
| GB | 2 268 699 | | 1/1994 |

OTHER PUBLICATIONS

Adapa Adaptive Moulds: "Double Curved Adaptive Moulds," User Manual (May 2021).
European Patent Office, Extended European Search Report, App. No. 23209353.4 (May 7, 2024).

* cited by examiner

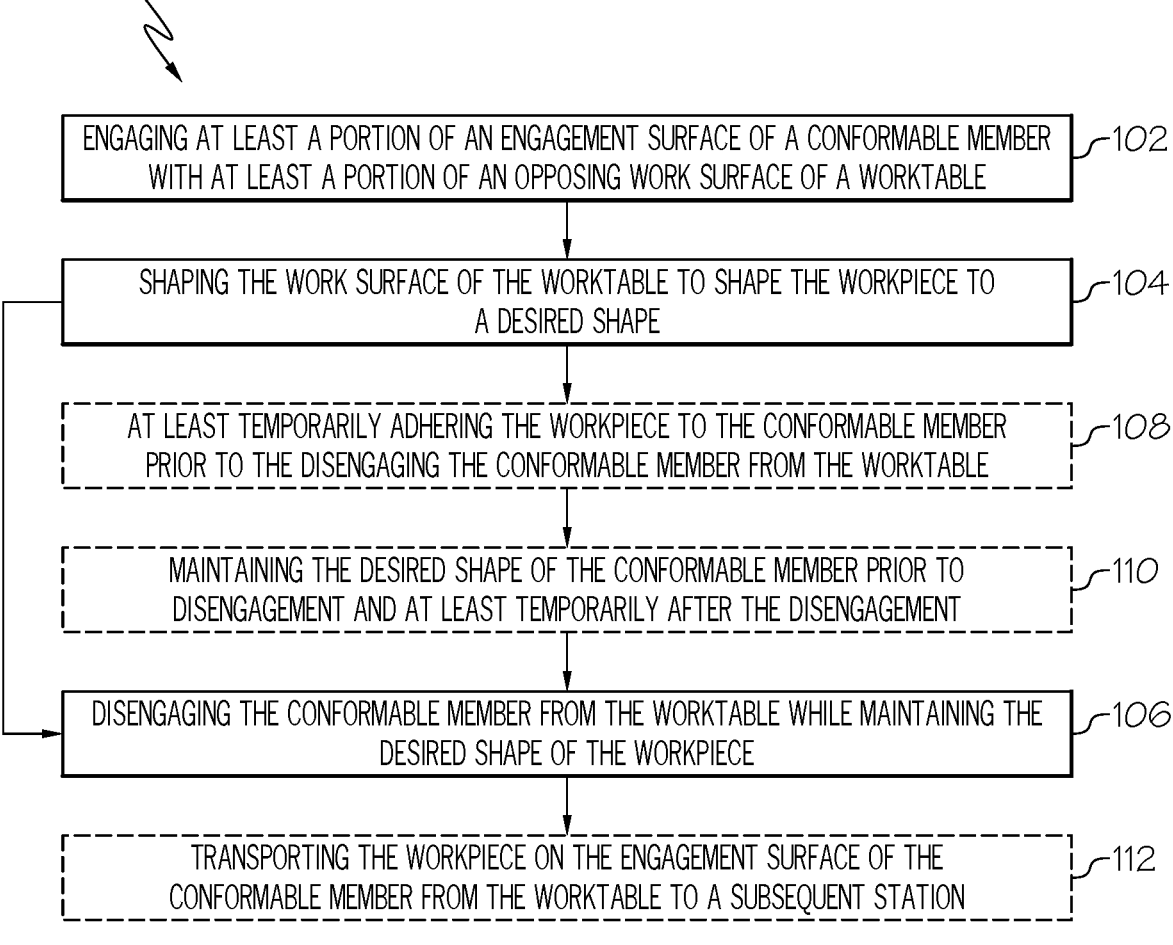

*100*

ENGAGING AT LEAST A PORTION OF AN ENGAGEMENT SURFACE OF A CONFORMABLE MEMBER WITH AT LEAST A PORTION OF AN OPPOSING WORK SURFACE OF A WORKTABLE ⟋102

SHAPING THE WORK SURFACE OF THE WORKTABLE TO SHAPE THE WORKPIECE TO A DESIRED SHAPE ⟋104

AT LEAST TEMPORARILY ADHERING THE WORKPIECE TO THE CONFORMABLE MEMBER PRIOR TO THE DISENGAGING THE CONFORMABLE MEMBER FROM THE WORKTABLE ⟋108

MAINTAINING THE DESIRED SHAPE OF THE CONFORMABLE MEMBER PRIOR TO DISENGAGEMENT AND AT LEAST TEMPORARILY AFTER THE DISENGAGEMENT ⟋110

DISENGAGING THE CONFORMABLE MEMBER FROM THE WORKTABLE WHILE MAINTAINING THE DESIRED SHAPE OF THE WORKPIECE ⟋106

TRANSPORTING THE WORKPIECE ON THE ENGAGEMENT SURFACE OF THE CONFORMABLE MEMBER FROM THE WORKTABLE TO A SUBSEQUENT STATION ⟋112

FIG. 1

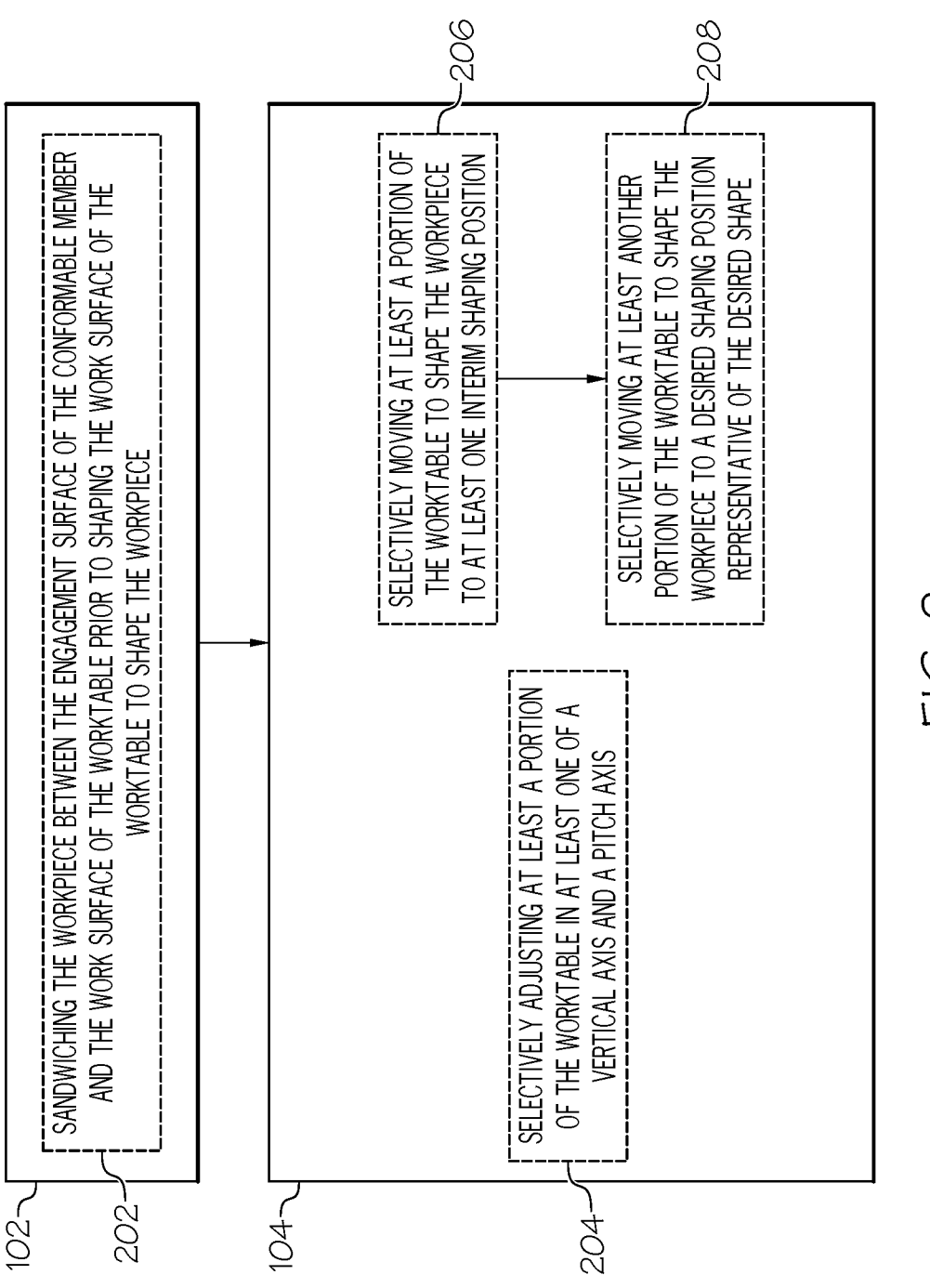

*202* SANDWICHING THE WORKPIECE BETWEEN THE ENGAGEMENT SURFACE OF THE CONFORMABLE MEMBER AND THE WORK SURFACE OF THE WORKTABLE PRIOR TO SHAPING THE WORK SURFACE OF THE WORKTABLE TO SHAPE THE WORKPIECE

*104*

*204* SELECTIVELY ADJUSTING AT LEAST A PORTION OF THE WORKTABLE IN AT LEAST ONE OF A VERTICAL AXIS AND A PITCH AXIS

*206* SELECTIVELY MOVING AT LEAST A PORTION OF THE WORKTABLE TO SHAPE THE WORKPIECE TO AT LEAST ONE INTERIM SHAPING POSITION

*208* SELECTIVELY MOVING AT LEAST ANOTHER PORTION OF THE WORKTABLE TO SHAPE THE WORKPIECE TO A DESIRED SHAPING POSITION REPRESENTATIVE OF THE DESIRED SHAPE

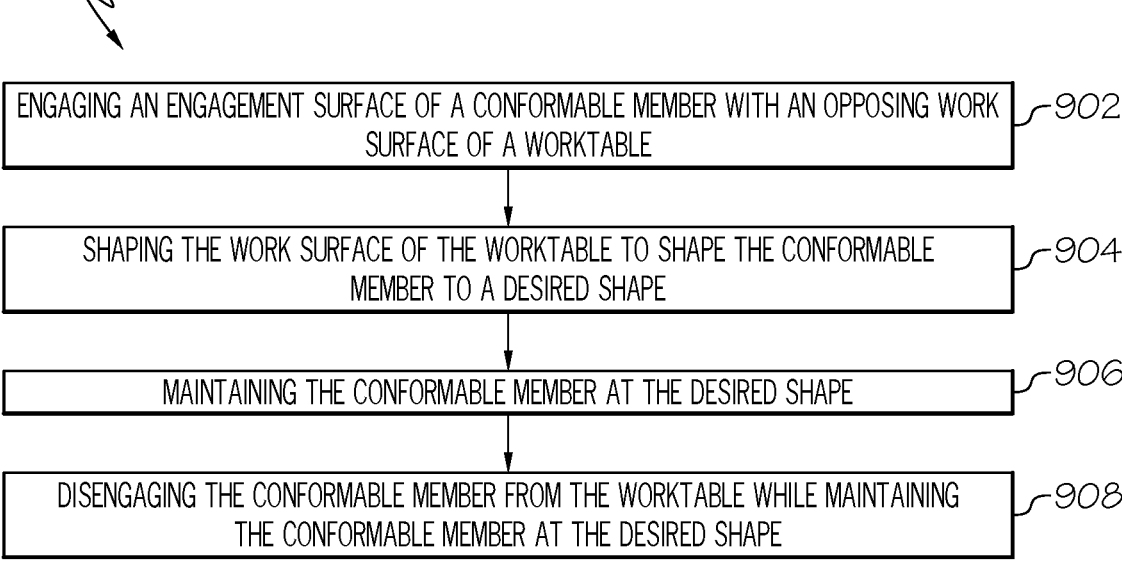

*900*

ENGAGING AN ENGAGEMENT SURFACE OF A CONFORMABLE MEMBER WITH AN OPPOSING WORK SURFACE OF A WORKTABLE   *902*

SHAPING THE WORK SURFACE OF THE WORKTABLE TO SHAPE THE CONFORMABLE MEMBER TO A DESIRED SHAPE   *904*

MAINTAINING THE CONFORMABLE MEMBER AT THE DESIRED SHAPE   *906*

DISENGAGING THE CONFORMABLE MEMBER FROM THE WORKTABLE WHILE MAINTAINING THE CONFORMABLE MEMBER AT THE DESIRED SHAPE   *908*

FIG. 9

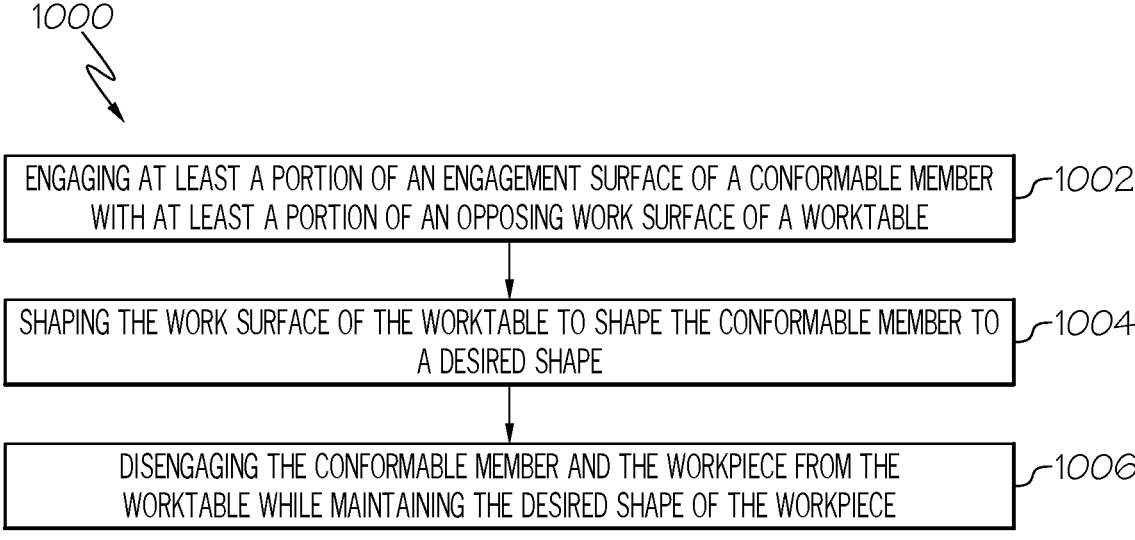

1000

ENGAGING AT LEAST A PORTION OF AN ENGAGEMENT SURFACE OF A CONFORMABLE MEMBER WITH AT LEAST A PORTION OF AN OPPOSING WORK SURFACE OF A WORKTABLE ⌐1002

SHAPING THE WORK SURFACE OF THE WORKTABLE TO SHAPE THE CONFORMABLE MEMBER TO A DESIRED SHAPE ⌐1004

DISENGAGING THE CONFORMABLE MEMBER AND THE WORKPIECE FROM THE WORKTABLE WHILE MAINTAINING THE DESIRED SHAPE OF THE WORKPIECE ⌐1006

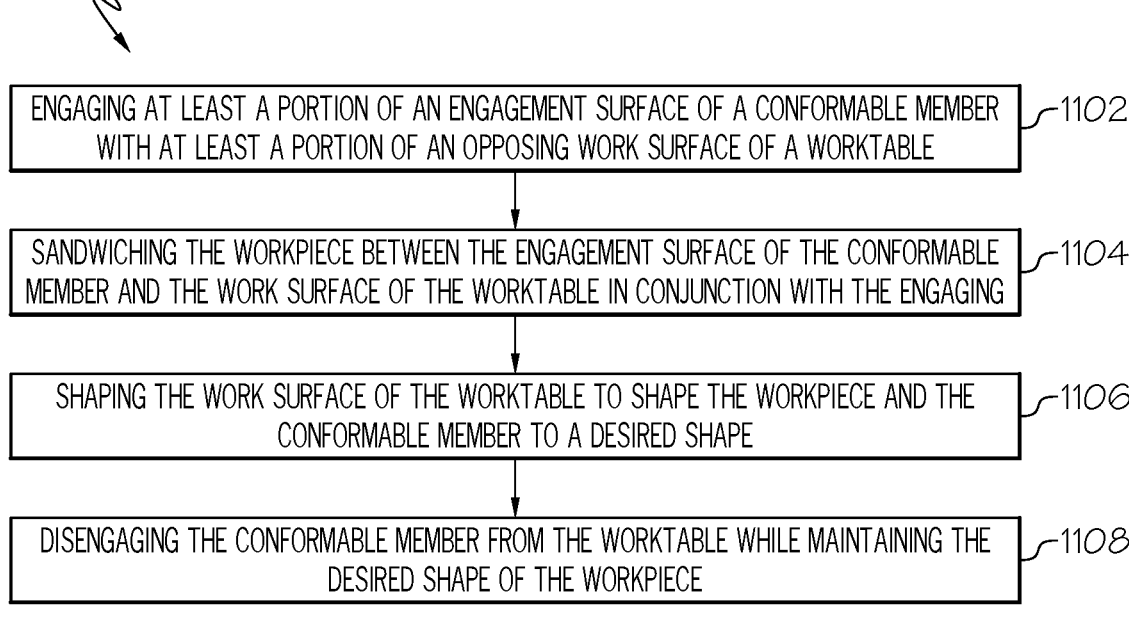

ENGAGING AT LEAST A PORTION OF AN ENGAGEMENT SURFACE OF A CONFORMABLE MEMBER WITH AT LEAST A PORTION OF AN OPPOSING WORK SURFACE OF A WORKTABLE — 1102

SANDWICHING THE WORKPIECE BETWEEN THE ENGAGEMENT SURFACE OF THE CONFORMABLE MEMBER AND THE WORK SURFACE OF THE WORKTABLE IN CONJUNCTION WITH THE ENGAGING — 1104

SHAPING THE WORK SURFACE OF THE WORKTABLE TO SHAPE THE WORKPIECE AND THE CONFORMABLE MEMBER TO A DESIRED SHAPE — 1106

DISENGAGING THE CONFORMABLE MEMBER FROM THE WORKTABLE WHILE MAINTAINING THE DESIRED SHAPE OF THE WORKPIECE — 1108

FIG. 11

METHOD FOR PREFORMING A WORKPIECE, COMPOSITE MANUFACTURING METHOD AND SYSTEM ASSOCIATED THEREWITH

FIELD

The present disclosure relates generally to preforming a workpiece to a desired shape and, particularly, to shaping a workpiece disposed between a shaping work surface and a conformable member. Various examples of preforming methods and systems disclose features that facilitate use of the conformable member to transport the shaped workpiece to a subsequent manufacturing station. For example, applications of the disclosed methods and systems to various types of reinforcement fabrics for composite manufacturing are disclosed herein. Applications to various other types of workpieces are also contemplated.

BACKGROUND

Existing solutions for preforming workpieces, particularly for preforming lightweight fabrics for composite manufacturing, require bulky and heavy equipment. For example, preforming accuracy is governed by the number of pogos/ prongs in an end effector used for the preforming. Actuators in such end effectors are large components that limit fidelity of the equipment. In other words, the quantity of actuators is limited by the size of the actuator while the desired fidelity is based on target contours for the preforming operation. Often the desired fidelity simply cannot be achieved because there is not enough space for the amount of actuators required to properly match the target contours. Thus, workpiece deformation is not accurate and creates problems meeting production requirements.

Accordingly, those skilled in the art continue with research and development efforts to preform workpieces to desired shapes and improve manufacturing processes.

SUMMARY

Disclosed are examples of a method for preforming a workpiece, a composite manufacturing method and a system associated therewith. The following is a non-exhaustive list of examples, which may or may not be claimed, of the subject matter according to the present disclosure.

In an example, the disclosed method for preforming a workpiece includes: (1) engaging at least a portion of an engagement surface of a conformable member with at least a portion of a work surface of a worktable, wherein the workpiece is prepositioned on the work surface such that the workpiece is compressed between the engagement surface and the work surface in conjunction with the engaging; (2) while the workpiece is sandwiched between the engagement surface of the conformable member and the work surface of the worktable, shaping the work surface of the worktable to shape the workpiece to a desired shape; and (3) disengaging the conformable member from the worktable while maintaining the desired shape of the workpiece, wherein the workpiece is retained on the engagement surface of the conformable member and removed from the work surface of the worktable.

In another example, the disclosed method for preforming a workpiece includes: (1) engaging at least a portion of an engagement surface of a conformable member with at least a portion of a work surface of a worktable, wherein the workpiece is prepositioned on the work surface such that the workpiece is compressed between the engagement surface and the work surface in conjunction with the engaging; (2) while the workpiece is sandwiched between the engagement surface of the conformable member and the work surface of the worktable, shaping the work surface of the worktable to shape the conformable member to a desired shape; and (3) disengaging the conformable member and the workpiece from the worktable while maintaining the desired shape of the workpiece, wherein the workpiece is retained on the engagement surface of the conformable member and removed from the work surface of the worktable.

In another example, the disclosed method for preforming a workpiece, includes: (1) engaging at least a portion of an engagement surface of a conformable member with at least a portion of a work surface of a worktable, wherein the workpiece is prepositioned on the work surface; (2) sandwiching the workpiece between the engagement surface of the conformable member and the work surface of the worktable in conjunction with the engaging; (3) while the workpiece is sandwiched between the engagement surface and the work surface, shaping the work surface of the worktable to shape the workpiece and the conformable member to a desired shape; and (4) disengaging the conformable member from the worktable while maintaining the desired shape of the workpiece, wherein the workpiece is retained on the engagement surface of the conformable member and removed from the work surface of the worktable.

In an example, the disclosed composite manufacturing method includes: (1) engaging an engagement surface of a conformable member with a work surface of a worktable; (2) while the engagement surface of the conformable member is engaged with the work surface of the worktable, shaping the work surface of the worktable to shape the conformable member to a desired shape; (3) maintaining the conformable member at the desired shape; and (4) disengaging the conformable member from the worktable while maintaining the conformable member at the desired shape.

In an example, the disclosed system for preforming a workpiece includes a conformable member with an engagement surface and a worktable with a work surface opposing the engagement surface. The conformable member is configured to engage at least a portion of the engagement surface with at least a portion of the work surface of the worktable to compress the workpiece between the engagement surface and the work surface after the workpiece is prepositioned on the work surface of the worktable. The work surface of the worktable is configured to shape the workpiece to a desired shape while the workpiece is sandwiched between the engagement surface and the work surface. The conformable member is configured to disengage from the worktable while maintaining engagement with the workpiece and while maintaining the desired shape of the workpiece.

Other examples of the disclosed methods and system will become apparent from the following detailed description, the accompanying drawings, and the appended claims.

BRIEF DESCRIPTION OF THE DRAWINGS

FIG. 1 is a flow diagram of an example of a method for preforming a workpiece;

FIG. 2, in combination with FIG. 1, is a flow diagram of another example of a method for preforming a workpiece;

FIG. 9 is a flow diagram of an example of a composite manufacturing method;

FIG. 10 is a flow diagram of another example of a method for preforming a workpiece; and FIG. 11 is a flow diagram of yet another example of a method for preforming a workpiece;

DETAILED DESCRIPTION

Figure 3:
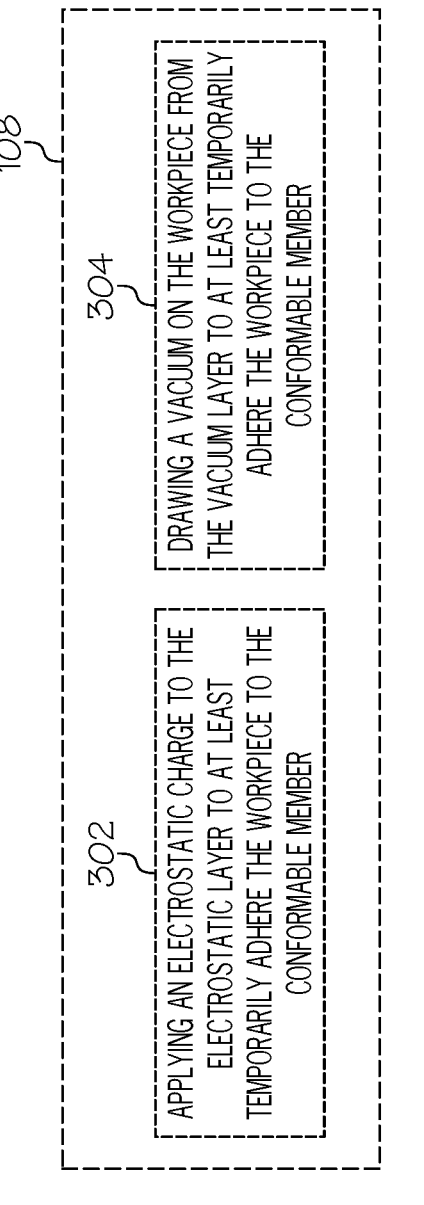
FIG. 3, in combination with FIG. 1, is a flow diagram of yet another example of a method for preforming a workpiece.
Figure 4:
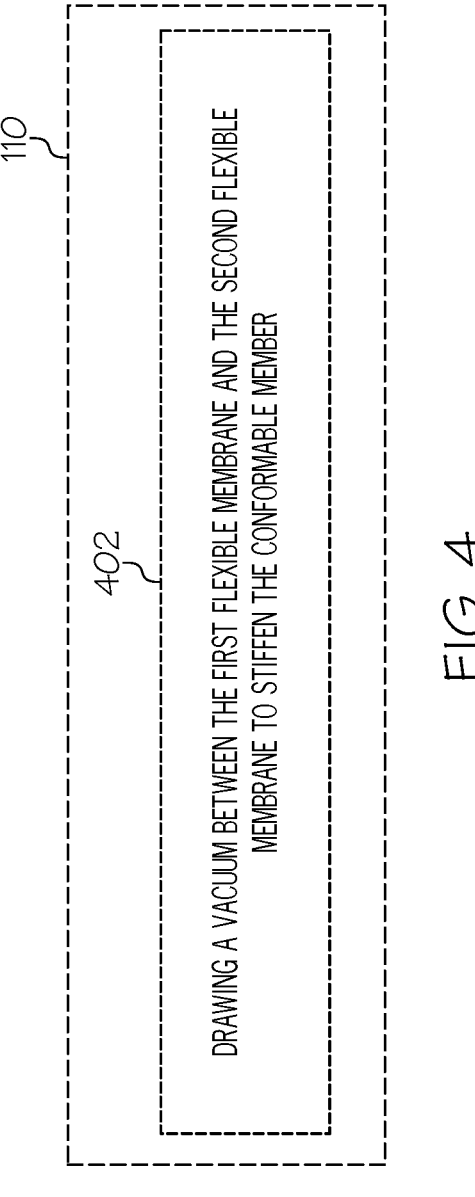
FIG. 4, in combination with FIG. 1, is a flow diagram of still another example of a method for preforming a workpiece.
Figure 5:
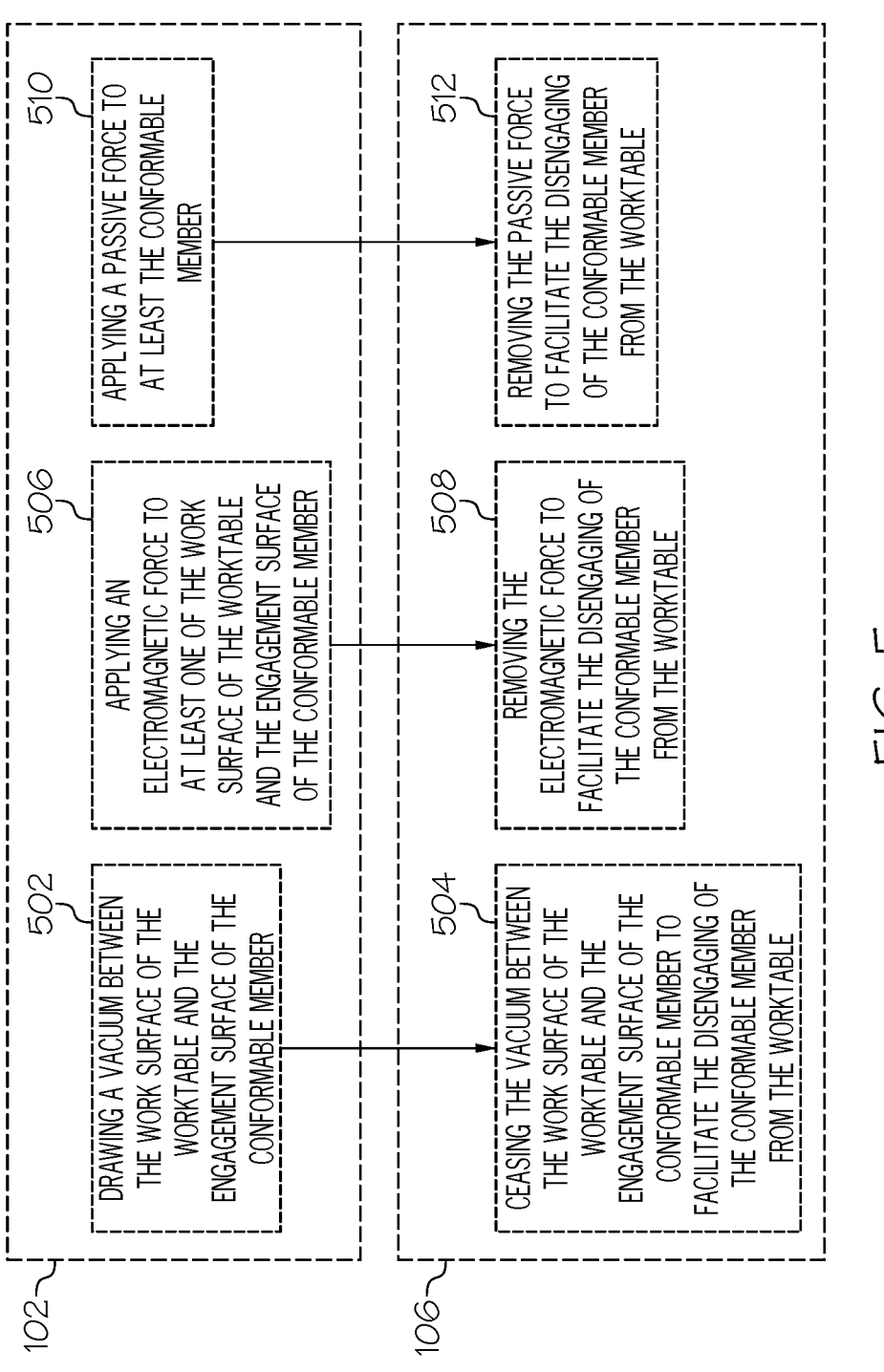
FIG. 5, in combination with FIG. 1, is a flow diagram of still yet another example of a method for preforming a workpiece.

Referring generally to FIGS. 1-6, 7A, 7B, 8, 10 and 11-14, by way of examples, the present disclosure is directed to a method 100, 1000, 1100 for preforming a workpiece 602. FIGS. 1-5 show examples of a method 100 that compresses a prepositioned workpiece 602 between a conformable member 604 and a work surface 610, shapes the workpiece 602, and disengages from the work surface 610 while retaining the workpiece 602 on the conformable member 604 and maintaining the shape of the workpiece 602. FIG. 10 shows an example of a method 1000 for preforming the workpiece 602 in slightly different scope. FIG. 11 shows an example of a method 1100 that engages the conformable member 604 with the work surface 610 upon which the workpiece 602 was prepositioned, sandwiches the workpiece 602 between the conformable member 604 and the work surface 610, shapes the workpiece 602, and disengages from the work surface 610 while retaining the workpiece 602 on the conformable member 604 and maintaining the shape of the conformable member 604 and the workpiece 602.

With reference again to FIGS. 1, 6 and 12-14, in one or more examples, a method 100 for preforming a workpiece 602 includes engaging 102 at least a portion of an engagement surface 606 of a conformable member 604 with at least a portion of an opposing work surface 610 of a worktable 608. The workpiece 602 is prepositioned on the work surface 610 (see, e.g., FIG. 12) such that the workpiece 602 is compressed between the engagement surface 606 and the work surface 610 in conjunction with the engaging 102. Next, while the workpiece 602 is sandwiched between the engagement surface 606 of the conformable member 604 and the work surface 610 of the worktable 608, shaping 104 the work surface 610 of the worktable 608 to shape the workpiece 602 to a desired shape (see, e.g., FIG. 13). At 106, the conformable member 604 is disengaged from the worktable 608 while maintaining the desired shape of the workpiece 602 (see, e.g., FIG. 14). The workpiece 602 is retained on the engagement surface 606 of the conformable member 604 and removed from the work surface 610 of the worktable 608.

The workpiece 602 may include one or more plies cut from a roll of fabric. As such, the workpiece 602 may initially be relatively flat prior to its shaping. The conformable member 604 is a shape retaining component that selectively changes between a more flexible state to a stiffer state. The features of the conformable member 604 are described in more detail below. The worktable 608, particularly the work surface 610, is the shaping component that is configured to shape the workpiece 602 and the conformable member 604 based on the desired shape. The features of the worktable 608 are also described in more detail below. The worktable 608 may also be referred to as a shape forming table, an adaptive table, an adjustable table or other similarly descriptive names.

In another example of the method 100, the desired shape includes a three-dimensional shape, a first curved shape, a second curved shape with a double curvature, a third curved shape with two or more curvatures, a two-dimensional shape, or any other suitable shape.

In yet another example, the method 100 also includes at least temporarily adhering 108 the workpiece 602 to the conformable member 604 prior to the disengaging 106 of the conformable member 604 from the worktable 608.

In a further example, the method also includes maintaining 110 the desired shape of the conformable member 604 prior to disengagement and at least temporarily after the disengagement.

In still another example, the method 100 also includes transporting 112 the workpiece 602 on the engagement surface 606 of the conformable member 604 from the worktable 608 to a subsequent station. For example, the workpiece 602 may be transported to a layup tool for resin infusion.

In still yet another example of the method 100, the workpiece 602 comprises at least one ply of a reinforcement fabric. In a further example, the reinforcement fabric comprises carbon fibers. In another further example, the reinforcement fabric comprises pre-impregnated fibers. In other examples, the reinforcement fabric may include a dry carbon fabric, a carbon fabric, a graphite fabric, a pre-impregnated fabric, a fiberglass fabric, an aramid fabric, a nylon fabric, or any suitable reinforcement fabric.

In another example of the method 100, the workpiece 602 comprises a first ply of reinforcement fabric, a second ply of reinforcement fabric, and a thermoplastic veil between the first ply of reinforcement fabric and the second ply of reinforcement fabric. In a further embodiment, the first ply of reinforcement fabric is tack adhered to the second ply of reinforcement fabric.

In yet another example of the method 100, the workpiece 602 comprises a first ply of pre-impregnated reinforcement fabric and a second ply of pre-impregnated reinforcement fabric.

In still another example of the method 100, the workpiece 602 is a dry composite material.

With reference again to FIGS. 1, 2 and 6, in another example of the method 100 of FIG. 1, the engaging 102 may include sandwiching 202 the workpiece 602 between the engagement surface 606 of the conformable member 604 and the work surface 610 of the worktable 608 prior to shaping 104 the work surface 610 of the worktable 608 to shape the workpiece 602.

In yet another example of the method 100 of FIG. 1, the shaping 104 the work surface 610 of the worktable 608 may include selectively adjusting 204 at least a portion of the worktable 608 in at least one of a vertical axis and a pitch axis. For example, the worktable 608 may include a plurality of actuators arranged in a grid pattern and configured to selectively raise and lower the work surface 610 in the vertical axis to represent curvatures and contours associated with the desired shape for the workpiece 602. Similarly, additional actuators may be used to control the pitch of one or more of the vertical axis actuators to achieve the desired shape.

In still another example of the method 100 of FIG. 1, the shaping 104 the work surface 610 of the worktable 608 may include selectively moving 206 at least a portion of the worktable 608 to shape the workpiece 602 to at least one interim shaping position. Next, selectively moving 208 at least another portion of the worktable 608 to shape the workpiece 602 to a desired shaping position representative of the desired shape. The use of multiple shaping position may improve the shaping operation by avoiding wrinkles, bridging, and other defects that can occur in a preformed workpiece.

With reference again to FIGS. 1, 3, 6 and 7A, in still yet another example of the method 100 of FIG. 1, the conformable member 604 comprises an electrostatic layer 702. In this example, at least temporarily adhering 108 the workpiece 602 to the conformable member 604 may include applying 302 an electrostatic charge to the electrostatic layer 702 to at least temporarily adhere the workpiece 602 to the conformable member 604.

With reference again to FIGS. 1, 3, 6 and 7B, in another example of the method 100 of FIG. 1, the conformable member 604 comprises a vacuum layer 704. In this example, at least temporarily adhering 108 the workpiece 602 to the conformable member 604 may include drawing 304 a vacuum on the workpiece 602 from the vacuum layer 704 to at least temporarily adhere the workpiece 602 to the conformable member 604.

With reference again to FIGS. 1, 4, 6 and 8, in yet another example of the method 100 of FIG. 1, the conformable member 604 comprises a first flexible membrane 802, a conformable core layer 804, and a second flexible membrane 806. The first flexible membrane 802 and the second flexible membrane 806 are sealed around a perimeter of the conformable core layer 804. In this example, maintaining 110 the desired shape of the conformable member 604 may include drawing 402 a vacuum between the first flexible membrane 802 and the second flexible membrane 806 to stiffen the conformable member 604.

With reference again to FIGS. 1, 5 and 6, in still another example of the method 100 of FIG. 1, the engaging 102 may include drawing 502 a vacuum between the work surface 610 of the worktable 608 and the engagement surface 606 of the conformable member 604. In a further example, the vacuum may be drawn via at least one of the worktable 608 and the conformable member 604. In another further example, the disengaging 106 of FIG. 1 may include ceasing 504 the vacuum between the work surface 610 of the worktable 608 and the engagement surface 606 of the conformable member 604 to facilitate the disengaging 106 of the conformable member 604 from the worktable 608.

In still yet another example of the method 100 of FIG. 1, the engaging 102 may include applying 506 an electromagnetic force to at least one of the work surface 610 of the worktable 608 and the engagement surface 606 of the conformable member 604. In a further example, the electromagnetic force facilitates sandwiching 202 of the workpiece 602 between the engagement surface 606 of the conformable member 604 and the work surface 610 of the worktable 608. In another further example, the disengaging 106 of FIG. 1 may include removing 508 the electromagnetic force to facilitate the disengaging 106 of the conformable member 604 from the worktable 608.

In another example of the method 100 of FIG. 1, the engaging 102 may include applying 510 a passive force to at least the conformable member 604. In a further example, the passive force facilitates sandwiching 202 of the workpiece 602 between the engagement surface 606 of the conformable member 604 and the work surface 610 of the worktable 608. In another further example, the disengaging 106 of FIG. 1 may include removing 512 the passive force to facilitate the disengaging 106 of the conformable member 604 from the worktable 608.

Figure 6:
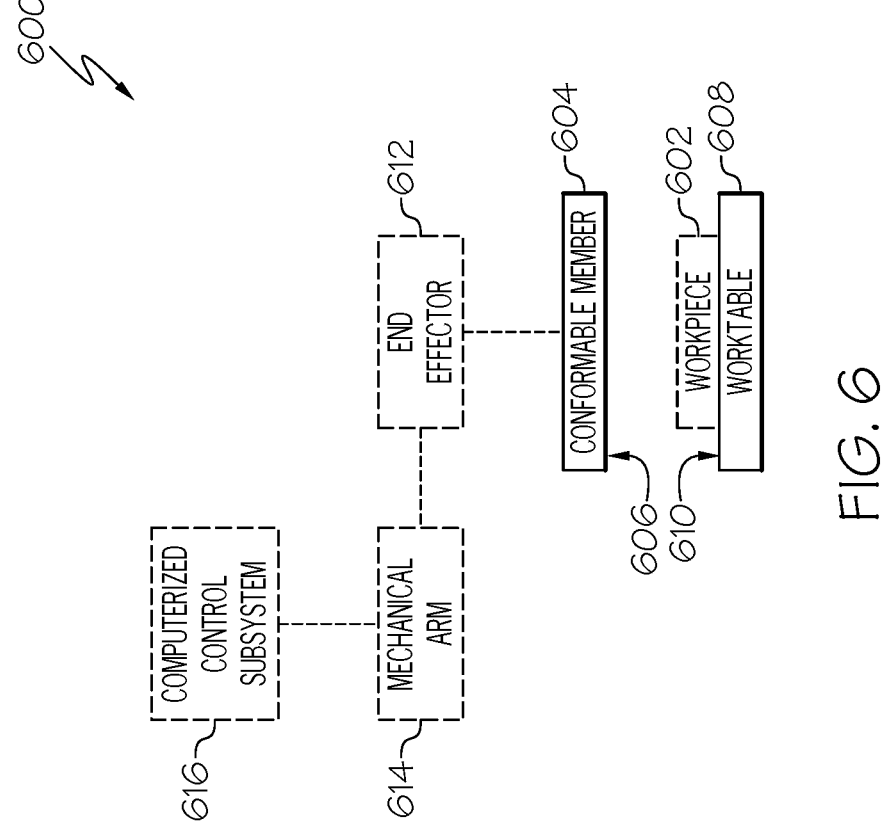
FIG. 6 is a schematic of an example of a system for preforming a workpiece, depicted in a functional diagram.
Figure 7B:
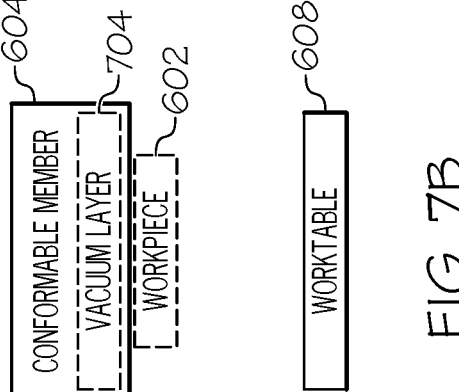
FIGS. 7A and 7B are schematics showing examples of a conformable member shown in the system of FIG. 6, depicted in functional diagrams.
Figure 7A:
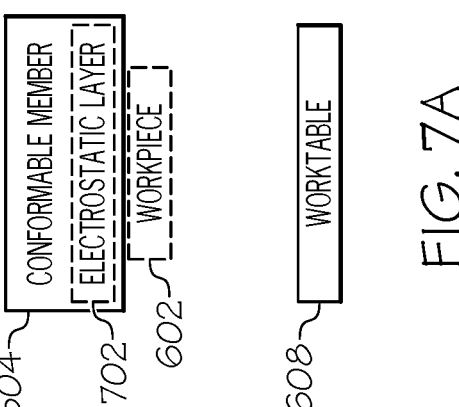
Figure 8:
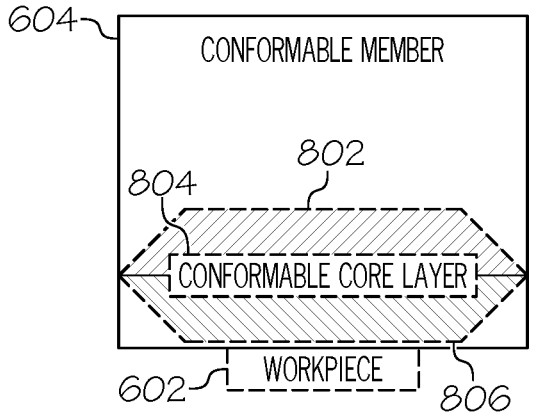
FIG. 8 is a schematic showing another example of the conformable member shown in the system of FIG. 6, depicted in a functional diagram.

Referring generally to FIGS. 6, 7A, 7B, 8 and 12-14, by way of examples, the present disclosure is directed to a system 600 for preforming a workpiece 602. The system 600 includes a conformable member 604 with an engagement surface 606 and a worktable 608 with a work surface 610. FIG. 6 shows a functional diagram of these components along with optional end effector 612, mechanical arm 614 and computerized control subsystem 616 components. FIGS. 7A, 7B, and 8, for example, show functional diagrams of the conformable member 604 and further optional components.

With reference again to FIGS. 6 and 12-14, in one or more examples, a system 600 for preforming a workpiece 602 includes a conformable member 604 with an engagement surface 606 and a worktable 608 with a work surface 610. The work surface 610 opposing the engagement surface 606. The conformable member 604 is configured to engage at least a portion of the engagement surface 606 with at least a portion of the work surface 610 of the worktable 608 to compress the workpiece 602 between the engagement surface 606 and the work surface 610 after the workpiece 602 is prepositioned on the work surface 610 of the worktable 608 (see, e.g., FIG. 12). The work surface 610 of the worktable 608 is configured to shape the workpiece 602 to a desired shape (see, e.g., FIG. 13) while the workpiece 602 is sandwiched between the engagement surface 606 and the work surface 610. The conformable member 604 is configured to disengage from the worktable 608 while maintaining engagement with the workpiece 602 and while maintaining the desired shape of the workpiece 602 (see, e.g., FIG. 14).

In another example, the system 600 also includes an end effector 612, a mechanical arm 614 and a computerized control subsystem 616. The end effector 612 configured to receive the conformable member 604. The mechanical arm 614 configured to receive the end effector 612. The computerized control subsystem 616 configured to control the mechanical arm 614, the end effector 612, and the conformable member 604 to engage the engagement surface 606 of the conformable member 604 with the work surface 610 of the worktable 608, to disengage the conformable member 604 from the worktable 608, and to transport the workpiece 602 on the engagement surface 606 of the conformable member 604 from the worktable 608 to a subsequent station. For example, the end effector 612 may include a pick and place (PnP) end effector suitable for gripping the conformable member 604.

In a more simplified example, the system 600 may include a hand-held lifting device to position the conformable member 604 on the worktable 608. Similarly, the hand-held lifting device may be used to remove the conformable member 604 and the workpiece 602 from the worktable 608. The hand-held lifting device may be configured to enable multi-person lifting to accommodate safety requirements.

In yet another example of the system 600, the conformable member 604 and the worktable 608 are configured to sandwich the workpiece 602 between the engagement surface 606 of the conformable member 604 and the work surface 610 of the worktable 608.

In still another example of the system 600, the worktable 608 is configured to shape the workpiece 602 to the desired shape by selectively adjusting 204 (see FIG. 2) at least a portion of the worktable 608 in at least one of a vertical axis and a pitch axis.

In still yet another example of the system 600, the worktable 608 is configured to selectively move at least a portion of the worktable 608 to shape the workpiece 602 to at least one interim shaping position. The worktable 608 is configured to selectively move at least another portion of the worktable 608 to shape the workpiece 602 to a desired shaping position representative of the desired shape.

In another example of the system 600, the desired shape includes a three-dimensional shape, a first curved shape, a second curved shape with a double curvature, a third curved shape with two or more curvatures, a two-dimensional shape, or any other suitable shape.

In yet another example of the system 600, the conformable member 604 is configured to at least temporarily adhere the workpiece 602 to the conformable member 604 prior to disengaging 106 (see FIG. 1) from the worktable 608. In a further example, the conformable member 604 is configured to maintain the desired shape prior to disengagement and at least temporarily after the disengagement.

In still another example, the system 600 is configured to draw a vacuum between the work surface 610 of the worktable 608 and the engagement surface 606 of the conformable member 604. In a further example, at least one of the worktable 608 and the conformable member 604 are configured to draw the vacuum. In another further example, the system 600 is configured to cease the vacuum between the work surface 610 of the worktable 608 and the engagement surface 606 of the conformable member 604 to facilitate disengaging 106 (see FIG. 1) of the conformable member 604 from the worktable 608.

In still yet another example, the system 600 is configured to apply an electromagnetic force to at least one of the work surface 610 of the worktable 608 and the engagement surface 606 of the conformable member 604. In a further example, the electromagnetic force facilitates sandwiching 202 (see FIG. 2) of the workpiece 602 between the engagement surface 606 of the conformable member 604 and the work surface 610 of the worktable 608. In another further example, the system 600 is configured to remove the electromagnetic force to facilitate disengaging 106 (see FIG. 1) of the conformable member 604 from the worktable 608.

In another example, the system 600 is configured to apply a passive force to at least the conformable member 604. In a further example, the passive force facilitates sandwiching 202 (see FIG. 2) of the workpiece 602 between the engagement surface 606 of the conformable member 604 and the work surface 610 of the worktable 608. In another further example, the system 600 is configured to remove the passive force to facilitate disengaging 106 (see FIG. 1) of the conformable member 604 from the worktable 608.

With reference again to FIGS. 6 and 7, in one or more examples, the conformable member 604 of FIG. 6 may include an electrostatic layer 702. In this example, the conformable member 604 is configured to apply an electrostatic charge to the electrostatic layer 702 to at least temporarily adhere the workpiece 602 to the conformable member 604.

In another example, the conformable member 604 of FIG. 6 may include a vacuum layer 704. In this example, the conformable member 604 is configured to draw a vacuum on the workpiece 602 using the vacuum layer 704 to at least temporarily adhere the workpiece 602 to the conformable member 604.

With reference again to FIGS. 6 and 8, in one or more examples, the conformable member 604 of FIG. 6 may include a first flexible membrane 802, a conformable core layer 804 and a second flexible membrane 806. The first flexible membrane 802 and the second flexible membrane 806 are sealed around a perimeter of the conformable core layer (804). In this example, the conformable member 604 is configured to permit a vacuum to be drawn between the first flexible membrane 802 and the second flexible membrane 806 to stiffen the conformable member 604.

Referring generally to FIGS. 6, 8, 9 and 12-14, by way of examples, the present disclosure is directed to a composite manufacturing method 900. FIG. 9 shows an example of a method 900 that engages a conformable member 604 with the work surface 610, shapes the conformal member 604, maintains the shape of the conformable member 604, and disengages from the work surface 610 while maintaining the shape of the conformable member 604.

With reference again to FIGS. 6, 9 and 12-14, in one or more examples, a composite manufacturing method 900 includes engaging 902 an engagement surface 606 of a conformable member 604 with an opposing work surface 610 of a worktable 608. Next, while the engagement surface 606 of the conformable member 604 is engaged with the work surface 610 of the worktable 608, shaping 904 the work surface 610 of the worktable 608 to shape the conformable member 604 to a desired shape (see, e.g., FIG. 13). At 906, the conformable member 604 is maintained at the desired shape. Next, disengaging 908 the conformable member 604 from the worktable 608 while maintaining 906 the conformable member 604 at the desired shape (see, e.g., FIG. 14).

Figure 12:
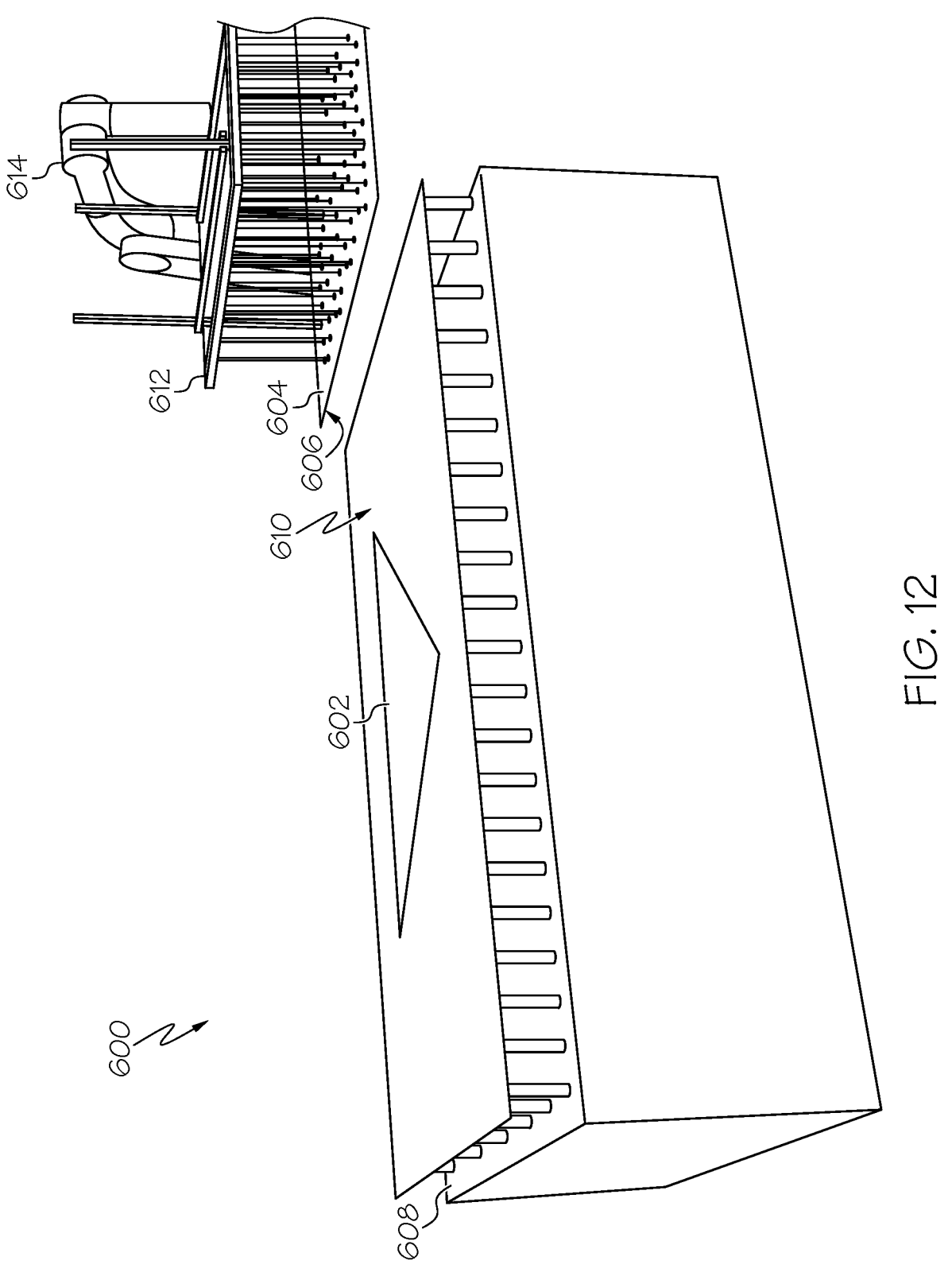
FIG. 12 is a perspective view of an example of a system for preforming a workpiece showing an initial condition with the workpiece prepositioned.
Figure 13:
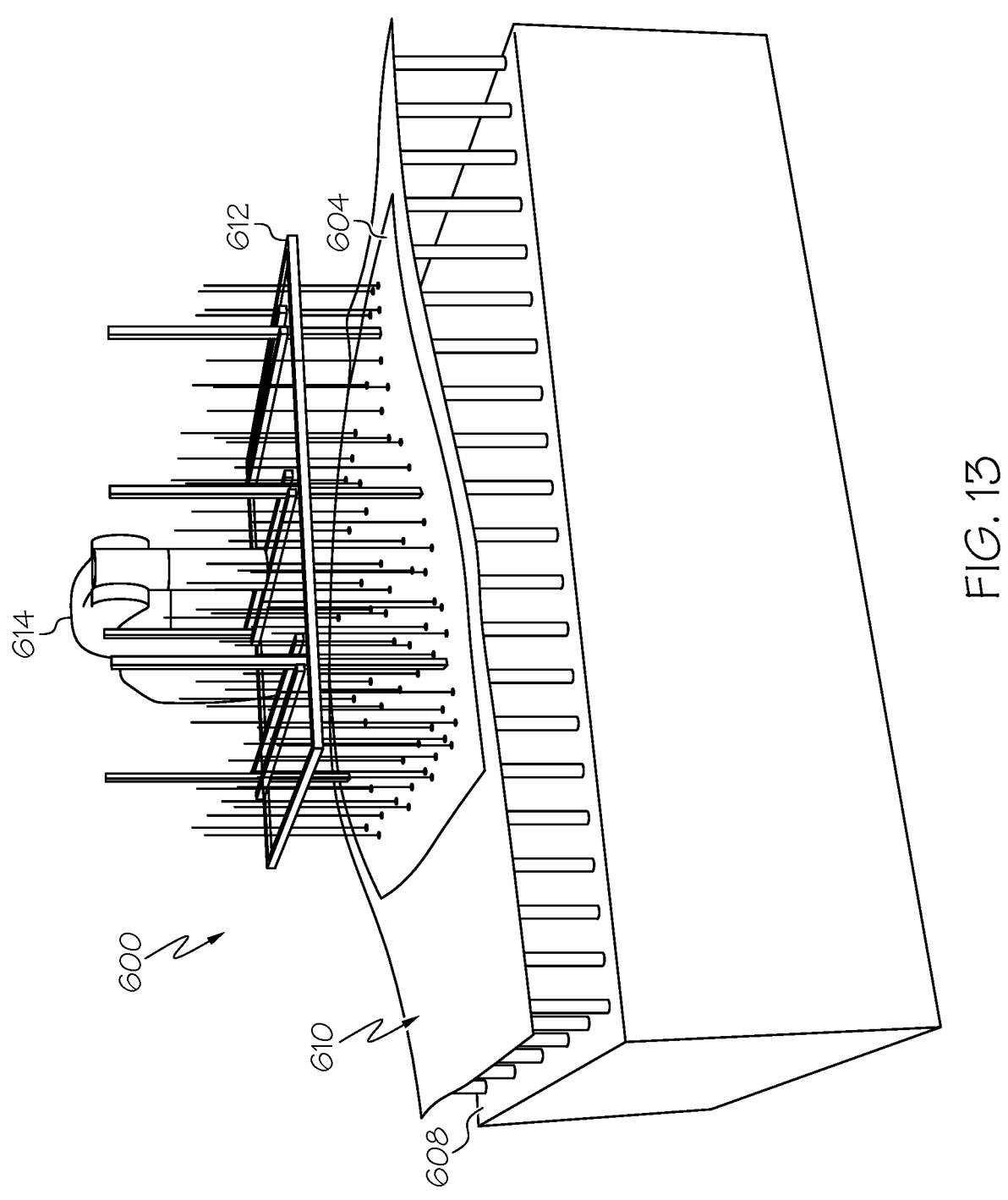
FIG. 13 is another perspective view of the system of FIG. 12 showing the work surface, workpiece, and conforming member in a three-dimensional shape.
Figure 14:
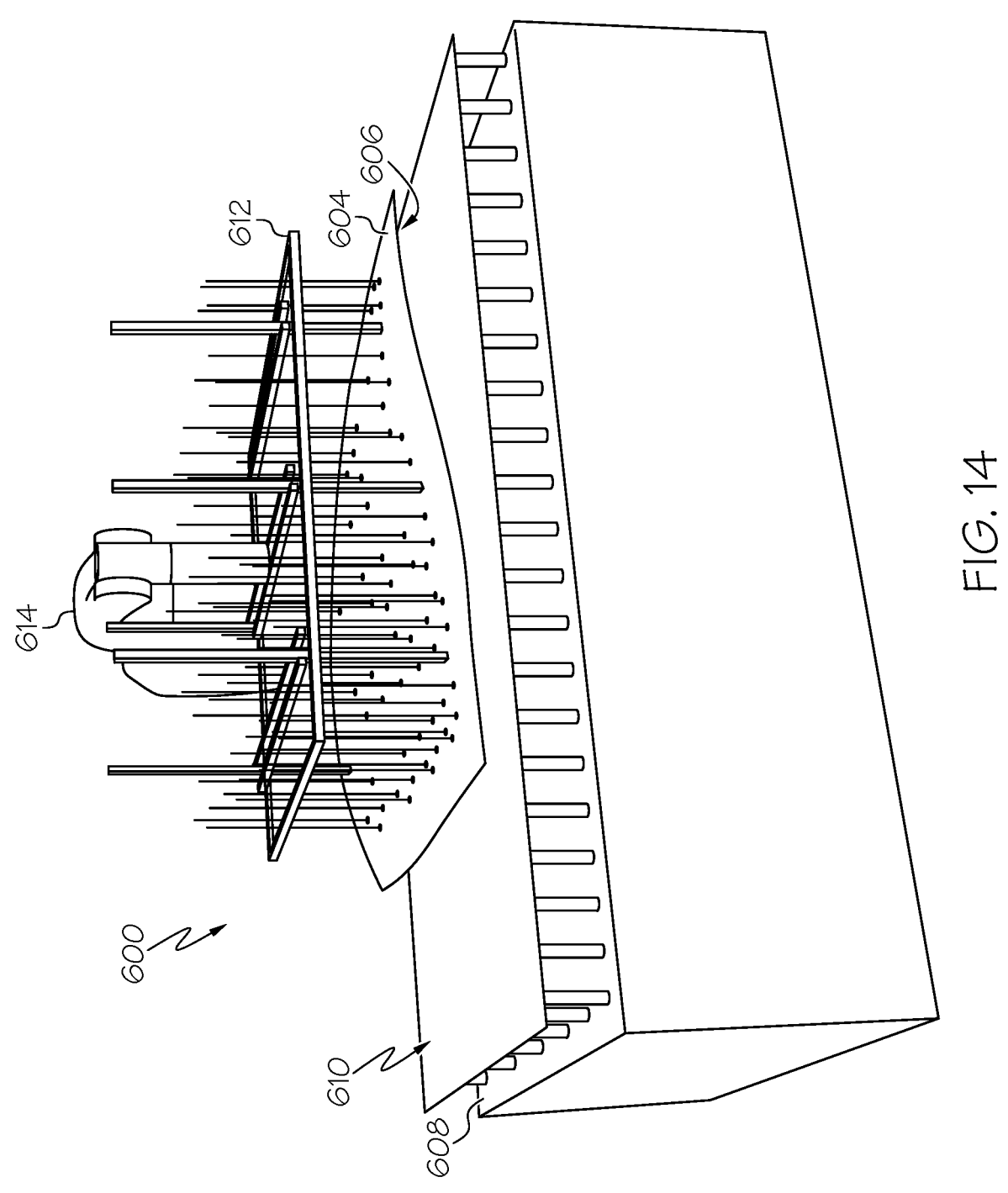
FIG. 14 is yet another perspective view of the system of FIG. 12 showing the conforming member and workpiece disengaged from the surface of the worktable.

In another example of the method 900, a workpiece 602 is prepositioned on the work surface 610 (see, e.g., FIG. 12). In this example, the workpiece 602 is compressed between the engagement surface 606 of the conformable member 604 and the work surface 610 of the worktable 608. The shaping 904 the work surface 610 of the worktable 608 also shapes the workpiece 602 to the desired shape. The desired shape of the workpiece 602 is maintained. The workpiece 602 is retained on the engagement surface 606 of the conformable member 604 and removed from the work surface 610 of the worktable 608.

With reference again to FIGS. 6, 8, and 9, in one or more examples of the method 900, the conformable member 604 comprises a first flexible membrane 802, a conformable core layer 804, and a second flexible membrane 806. The first flexible membrane 802 and the second flexible membrane 806 are sealed around a perimeter of the conformable core layer 804. In this example, maintaining 906 the conformable member 604 at the desired shape may include drawing a vacuum on the conformable member 604 to stiffen the conformable member 604 at the desired shape.

With reference again to FIGS. 6, 10 and 12-14, in one or more examples, a method 1000 for preforming a workpiece 602 includes engaging 1002 at least a portion of an engagement surface 606 of a conformable member 604 with at least a portion of an opposing work surface 610 of a worktable

608. The workpiece 602 is prepositioned on the work surface 610 (see, e.g., FIG. 12) such that the workpiece 602 is compressed between the engagement surface 606 and the work surface 610 in conjunction with the engaging 1002. Next, while the workpiece 602 is sandwiched between the engagement surface 606 of the conformable member 604 and the work surface 610 of the worktable 608, shaping 1004 the work surface 610 of the worktable 608 to shape the conformable member 604 to a desired shape (see, e.g., FIG. 13). At 1006, the conformable member 604 and the workpiece 602 are disengaged from the worktable 608 while maintaining the desired shape of the workpiece 602 (see, e.g., FIG. 14). The workpiece 602 is retained on the engagement surface 606 of the conformable member 604 and removed from the work surface 610 of the worktable 608.

With reference again to FIGS. 6 and 11-14, in one or more examples, a method 1100 for preforming a workpiece 602 includes engaging 1102 at least a portion of an engagement surface 606 of a conformable member 604 with at least a portion of an opposing work surface 610 of a worktable 608. The workpiece 602 is prepositioned on the work surface 610 (see, e.g., FIG. 12). At 1104, the workpiece 602 is sandwiched between the engagement surface 606 of the conformable member 604 and the work surface 610 of the worktable 608 in conjunction with the engaging 1102. Next, while the workpiece 602 is sandwiched between the engagement surface 606 and the work surface 610, shaping 1106 the work surface 610 of the worktable 608 to shape the workpiece 602 and the conformable member 604 to a desired shape (see, e.g., FIG. 13). At 1108, the conformable member 604 is disengaged from the worktable 608 while maintaining the desired shape of the workpiece 602 (see, e.g., FIG. 14). The workpiece 602 is retained on the engagement surface 606 of the conformable member 604 and removed from the work surface 610 of the worktable 608.

Examples of the methods 100, 900, 1000, 1100 and the system 600 may be related to, or used in the context of workpiece (e.g., part) fabrication for aircraft manufacturing. Although an aircraft example is described, the examples and principles disclosed herein may be applied to other products in the aerospace industry and other industries, such as the automotive industry, the space industry, the construction industry, and other design and manufacturing industries. Accordingly, in addition to aircraft, the examples and principles disclosed herein may apply to stamp forming workpieces to form an assembly for other types of vehicles (e.g., land vehicles, marine vehicles, space vehicles, etc.), standalone structures, high-traffic surfaces, and other high-contact surfaces.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/of" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 6, 7A, 7B and 8, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 6, 7A, 7B and 8, referred to above, need be included in every example and not all elements, features, and/or components described herein are necessarily depicted in each illustrative example. Accordingly, some of the elements, features, and/or components described and illustrated in FIGS. 6, 7A, 7B and 8 may be combined in various ways without the need to include other features described and illustrated in FIGS. 6, 7A, 7B and 8, other drawing figures, and/or the accompanying disclosure, even though such combination or combinations are not explicitly illustrated herein. Similarly, additional features not limited to the examples presented, may be combined with some or all the features shown and described herein. Unless otherwise explicitly stated, the schematic illustrations of the examples depicted in FIGS. 6, 7A, 7B and 8, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 6, 7A, 7B and 8, and such elements, features, and/or components may not be discussed in detail herein with reference to each of FIGS. 6, 7A, 7B and 8. Similarly, all elements, features, and/or components may not be labeled in each of FIGS. 6, 7A, 7B and 8, but reference numerals associated therewith may be utilized herein for consistency.

In FIGS. 1-5 and 9-11, referred to above, the blocks may represent operations, steps, and/or portions thereof, and lines connecting the various blocks do not imply any particular order or dependency of the operations or portions thereof. It will be understood that not all dependencies among the various disclosed operations are necessarily represented. FIGS. 1-5 and 9-11 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but does not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the methods 100, 900, 1000, 1100 and the system 600 have been shown and described, modifications may occur to those skilled in the art upon reading the specification. The present application includes such modifications and is limited only by the scope of the claims.

What is claimed is:

1. A method for preforming a workpiece, the method comprising:

engaging at least a portion of an engagement surface of a conformable member with at least a portion of a work surface of a worktable, wherein the workpiece is prepositioned on the work surface such that the workpiece is compressed between another portion of the engagement surface and another portion of the work surface in conjunction with the engaging, wherein, prior to the workpiece being prepositioned on the work surface, the work surface opposes and faces the engagement surface;

while the workpiece is sandwiched between the engagement surface of the conformable member and the work surface of the worktable, selectively raising and lowering portions of the work surface of the worktable to shape the workpiece to a desired shape and to shape the conformable member to the desired shape; and disengaging the conformable member from the worktable while maintaining the desired shape of the workpiece, wherein the workpiece is retained on the engagement surface of the conformable member and removed from the work surface of the worktable.

2. The method of claim 1, wherein engaging comprises:

sandwiching the workpiece between the engagement surface of the conformable member and the work surface of the worktable prior to shaping the work surface of the worktable to shape the workpiece.

3. The method of claim 1, wherein shaping the work surface of the worktable comprises:

selectively adjusting at least a portion of the worktable in at least one of a vertical axis and a pitch axis.

4. The method of claim 1, wherein shaping the work surface of the worktable comprises:

selectively moving at least a portion of the worktable to shape the workpiece to at least one interim shaping position; and selectively moving at least another portion of the work-table to shape the workpiece to a desired shaping position representative of the desired shape.

5. The method of claim 1, wherein the desired shape includes at least one of a three-dimensional shape, a first curved shape, a second curved shape with a double curvature, a third curved shape with two or more curvatures, and a two-dimensional shape.

6. The method of claim 1, further comprising:

at least temporarily adhering the workpiece to the conformable member prior to the disengaging of the conformable member from the worktable.

7. The method of claim 6, wherein the conformable member comprises an electrostatic layer, and wherein at least temporarily adhering the workpiece to the conformable member comprises:

applying an electrostatic charge to the electrostatic layer to at least temporarily adhere the workpiece to the conformable member.

8. The method of claim 6, wherein the conformable member comprises a vacuum layer, and wherein at least temporarily adhering the workpiece to the conformable member comprises:

drawing a vacuum on the workpiece from the vacuum layer to at least temporarily adhere the workpiece to the conformable member.

9. The method of claim 6, further comprising:

maintaining the desired shape of the conformable member prior to disengagement and at least temporarily after the disengagement.

10. The method of claim 9, wherein the conformable member comprises a first flexible membrane, a conformable core layer, and a second flexible membrane, wherein the first flexible membrane and the second flexible membrane are sealed around a perimeter of the conformable core layer, and wherein maintaining the desired shape of the conformable member comprises:

drawing a vacuum between the first flexible membrane and the second flexible membrane to stiffen the conformable member.

11. The method of claim 1, wherein the engaging comprises:

drawing a vacuum between the work surface of the worktable and the engagement surface of the conformable member.

12. The method of claim 11, wherein the vacuum is drawn via at least one of the worktable and the conformable member.

13. The method of claim 11, wherein the disengaging comprises:

ceasing the vacuum between the work surface of the worktable and the engagement surface of the conformable member to facilitate the disengaging of the conformable member from the worktable.

14. The method of claim 1, wherein the engaging comprises:

applying an electromagnetic force to at least one of the work surface of the worktable and the engagement surface of the conformable member.

15. The method of claim 14, wherein the electromagnetic force facilitates sandwiching of the workpiece between the engagement surface of the conformable member and the work surface of the worktable.

16. The method of claim 14, wherein the disengaging comprises:

removing the electromagnetic force to facilitate the disengaging of the conformable member from the worktable.

17. The method of claim 1, wherein the engaging comprises:

applying a passive force to at least the conformable member.

18. The method of claim 17, wherein the passive force facilitates sandwiching of the workpiece between the engagement surface of the conformable member and the work surface of the worktable.

19. The method of claim 17, wherein the disengaging comprises:

removing the passive force to facilitate the disengaging of the conformable member from the worktable.

20. The method of claim 1, further comprising:

transporting the workpiece on the engagement surface of the conformable member from the worktable to a subsequent station.

21. The method of claim 1, wherein the workpiece comprises at least one ply of a reinforcement fabric.

22. A system for preforming a workpiece, the system comprising:

a conformable member with an engagement surface; and a worktable with a work surface opposing the engagement surface, wherein the conformable member is configured to engage at least a portion of the engagement surface with at least a portion of the work surface of the worktable to compress the workpiece between the engagement surface and the work surface after the workpiece is prepositioned on the work surface of the worktable, wherein the system is configured to selectively raise and lower portions of the work surface of the worktable to shape the workpiece to a desired shape and to shape the conformable member to the desired shape while the workpiece is sandwiched between the engagement surface and the work surface, and wherein the conformable member is configured to disengage from the worktable while maintaining engagement with the workpiece and while maintaining the desired shape of the workpiece.

23. A composite manufacturing method comprising:

engaging an engagement surface of a conformable member with a work surface of a worktable;

while the engagement surface of the conformable member is engaged with the work surface of the worktable, selectively raising and lowering portions of the work surface of the worktable to shape the conformable member to a desired shape;

maintaining the conformable member at the desired shape; and disengaging the conformable member from the worktable while maintaining the conformable member at the desired shape.

24. A method for preforming a workpiece, the method comprising:

engaging at least a portion of an engagement surface of a conformable member with at least a portion of a work surface of a worktable, wherein the workpiece is prepositioned on the work surface such that the workpiece is compressed between the engagement surface and the work surface in conjunction with the engaging;

while the workpiece is sandwiched between the engagement surface of the conformable member and the work surface of the worktable, selectively raising and lowering portions of the work surface of the worktable to shape the workpiece to a desired shape and to shape the conformable member to the desired shape; and disengaging the conformable member and the workpiece from the worktable while maintaining the desired shape of the workpiece, wherein the workpiece is retained on the engagement surface of the conformable member and removed from the work surface of the worktable.

25. A method for preforming a workpiece, the method comprising:

engaging at least a portion of an engagement surface of a conformable member with at least a portion of a work surface of a worktable, wherein the workpiece is prepositioned on the work surface;

sandwiching the workpiece between the engagement surface of the conformable member and the work surface of the worktable in conjunction with the engaging;

while the workpiece is sandwiched between the engagement surface and the work surface, selectively raising and lowering portions of the work surface of the worktable to shape the workpiece to a desired shape and to shape the conformable member to the desired shape; and disengaging the conformable member from the worktable while maintaining the desired shape of the workpiece, wherein the workpiece is retained on the engagement surface of the conformable member and removed from the work surface of the worktable.

* * * * *